United States Patent [19]

Giacobbe

[11] Patent Number: 4,895,509

[45] Date of Patent: Jan. 23, 1990

[54] COMPACT APPARATUS FOR MOLDING HOLLOW CONTAINERS IN MOLECULARLY ORIENTATABLE PLASTIC MATERIAL

[76] Inventor: Ferruccio Giacobbe, Via Don Orione 21, Milan, Italy

[21] Appl. No.: 217,961

[22] Filed: Jul. 12, 1988

[30] Foreign Application Priority Data

Jul. 20, 1987 [IT] Italy .................. 21342 A/87

[51] Int. Cl.[4] ............................................. B29C 69/00
[52] U.S. Cl. .................................. 425/383; 198/465.2; 425/534
[58] Field of Search ............... 425/534, 539, 259, 383; 264/542; 198/465.2, 795, 468.2

[56] References Cited

U.S. PATENT DOCUMENTS

| | | | |
|---|---|---|---|
| 2,999,579 | 9/1961 | Kostrzewa | 198/795 |
| 3,955,613 | 5/1976 | Lund | 198/795 X |
| 4,365,950 | 12/1982 | Harry et al. | 425/534 |
| 4,522,581 | 6/1985 | Schad et al. | 425/534 |
| 4,552,526 | 11/1985 | Hafele | 425/534 X |
| 4,690,633 | 9/1987 | Schad et al. | 425/534 X |
| 4,709,803 | 12/1987 | Swiderski | 425/534 X |
| 4,710,122 | 12/1987 | Villanueva | 198/795 X |

FOREIGN PATENT DOCUMENTS 228106  7/1987  European Pat. Off. ............ 425/534

Primary Examiner—Richard L. Chiesa
Attorney, Agent, or Firm—Herbert Dubno

[57] ABSTRACT

The compact apparatus for the molding of hollow containers in molecularly orientable plastic material has a plurality of units for forming the containers and a discharge unit for the formed containers. The units are aligned at least in a row, there being present a conveyor device adapted for linking the units. The conveyor device has a plurality of carriages having support jaws for the containers during the forming phase and being slidable on rectilinear guides along a first path linking the aligned units, and a second path parallel to same, linking the remaining unit or units. A translator moves the carriages from one of the parallel paths to the other at their relative ends. A step-feed actuator shifts the carriages along the first path, bringing the carriages holding the containers during the molding phase from one unit to the next of the aligned units. A transfer actuator displaces the carriages along the second path. The conveyor device defines a closed circuit, linking together the molding and discharge units.

1 Claim, 5 Drawing Sheets

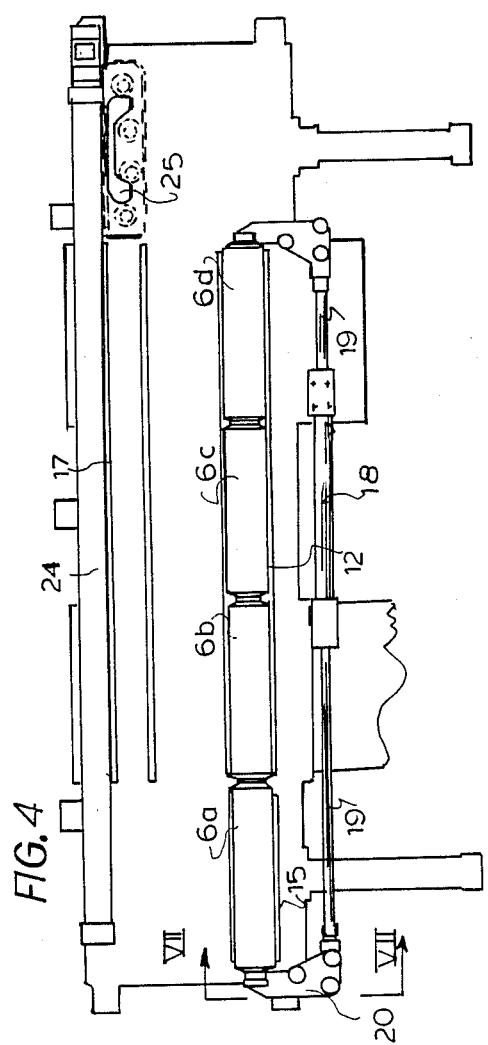
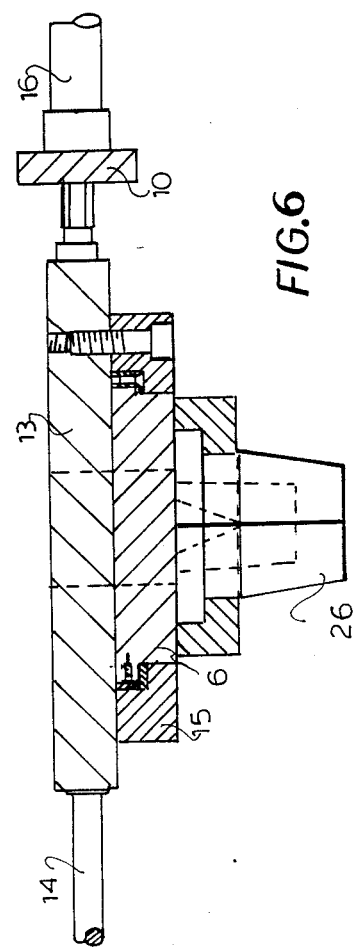

COMPACT APPARATUS FOR MOLDING HOLLOW CONTAINERS IN MOLECULARLY ORIENTATABLE PLASTIC MATERIAL

FIELD OF THE INVENTION

The present invention relates to a compact apparatus for the forming of hollow containers in molecularly orientatable plastic, the containers having molecular orientation in two mutually perpendicular directions.

BACKGROUND OF THE INVENTION

For numerous purposes containers of plastic materials are used, e.g. for containing liquids such as, for example, beverages and the like.

Such beverages frequently contain carbon dioxide or contain gases which can be released if the temperature is varied or the liquids are agitated, thus raising the pressure in the container.

Containers suitable for this purpose must, therefore, be resistant to the internal pressure applied to them and, moreover, must be impermeable over periods of time to the gases dissolved in the contained liquids.

A plastic material suitable for this purpose is polyethylene terephthalate, known by the abbreviation PET, which may be subjected to mechanical drawing deformations at an appropriate temperature. Such which deformations impart to the plastic material an oriented molecular structur increasing mechanical strength and imparting to gases substantially better then those of the non-oriented polymer and suitable for use in the aforementioned containers. For this purpose it is especially advantageous to provide a molecular orientation in two orthogonal directions in the material, by which the best results of mechanical strength and impermeability to gases are achieved, the mechanical strength and impermeability being of fundamental importance to the containers for liquids comprising gases in solution.

OBJECTS OF THE INVENTION

It is, therefore, an object of the invention to provide an apparatus for the forming or molding of containers, which shall create an oriented molecular structure in the greater part of the container, the apparatus being suitable for carrying out in automatic manner the successive operations necessary for the forming of a container with the aforementioned characteristics, with a rapid production cycle and a reduced size.

There is in fact known, from Italian patent application No. 23053 A/85 of the same applicant, an apparatus adapted for producing containers, but this apparatus has large overall dimensions, principally because of the device for carrying out conveying of the workpieces during the phase of molding from one operating unit to the other, and this constitutes a limitation to its field of use, especially for small manufacturers who do not have available adequate space for this purpose.

Another object, therefore, is to provide an improved apparatus, which shall carry out the complete cycle of molding automatically within a reduced space.

SUMMARY OF THE INVENTION

These results are achieved by the present invention, which provides a compact apparatus for the forming of hollow containers in molecularly orientatable plastics material, the apparatus comprising a plurality of molding units for the containers and a discharge unit for the molded containers. The units are aligned at least in a row, a conveyor device being provided for linking the units, the conveyor device comprising a plurality of carriages having supporting jaws for the containers during the forming phase, the carriages are slidable on rectilinear guides along a first path linking the aligned units, and a second path parallel to the first, linking the remaining unit or units. Means are provided for the translatory movement of the carriages from the one of the parallel paths to the other at their respective ends, there being also provides a step feed actuator for the carriages along the first path, bringing the carriages holding the containers during the forming phase from one unit to the next of the aligned units. A transfer actuator transfer the carriages along the second path. The means for translatory transfer of the carriages between the two paths and the transfer actuators for the carriages along the paths themselves defining a closed circuit linking together all the molding and discharge units.

In particular, the forming units for the containers comprise a unit for the injection molding of hollow preforms, at least one unit for thermal conditioning and axial drawing of the preforms and a molding unit for the containers for blowing the preforms. The units being aligned and linked together by rectilinear slide guides for the carriages holding the preforms, which guides support a plurality of carriages, bearing one against another, at least some of them being in correspondence with one of the molding units. An actuator is equipped with a thrust arm acting upon the first of the carriages carried by the guides and having a stroke equal to the length of one of the carriages, for transferring the carriages from one molding unit to the next at each of its actuations.

The molding units for the containers are aligned in contiguous positions, at a spacing equal to the length of a carriage of the conveyor device.

The discharge unit for the finished containers is disposed at one end of a pair of slide guides, the guides being disposed on a path parallel to the alignment path of the molding units, an actuator being present for transferring the carriages along said path between its two ends, corresponding to the positions for the means for transfer of the carriages to the parallel path.

The means for transfer of the carriages between the parallel paths comprises a slide slidable on fixed guides transversely to the paths. The slide is equipped with support guides for carrying one of the carriages. The slide is furthermore equipped with an actuator for traversing between a position with the relative support guides for the carriages in alignment with the guides of one of the paths and a position of alignment of the guides of the slide with the guides of the other of the parallel paths.

BRIEF DESCRIPTION OF THE DRAWING

The above and other objects, features and advantages of the present invention will become more readily apparent from the following description, reference being made to the accompanying drawing in which:

FIG. 4 is a cross-sectional view taken along the line IV—IV of FIG. 1;

FIG. 6 is section along line VI—VI of FIG. 5;

DETAILED DESCRIPTION OF THE DRAWINGS

Figure 1:
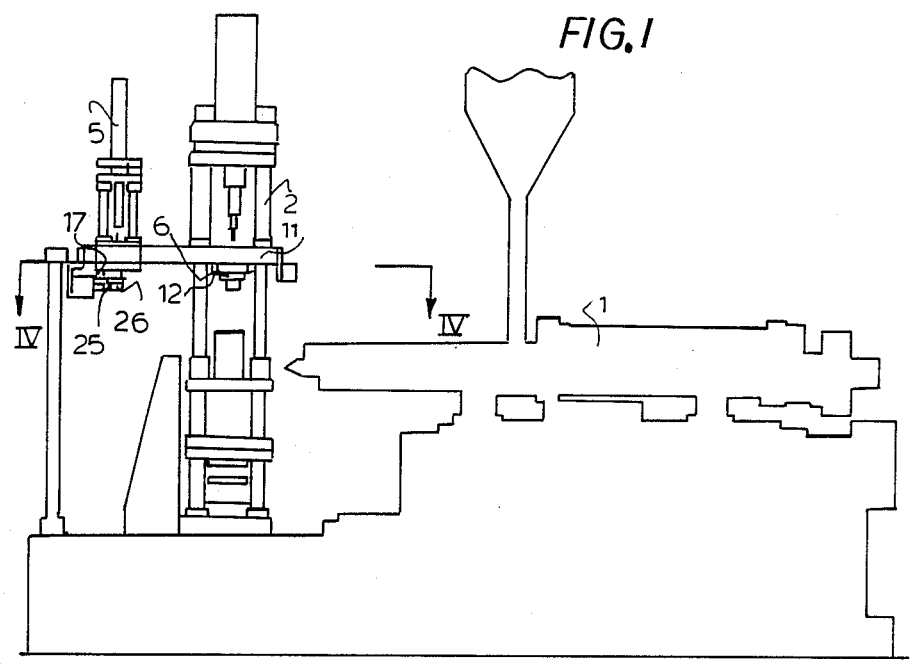
FIG. 1 is schematic side view of an apparatus according to this invention.
Figure 2:
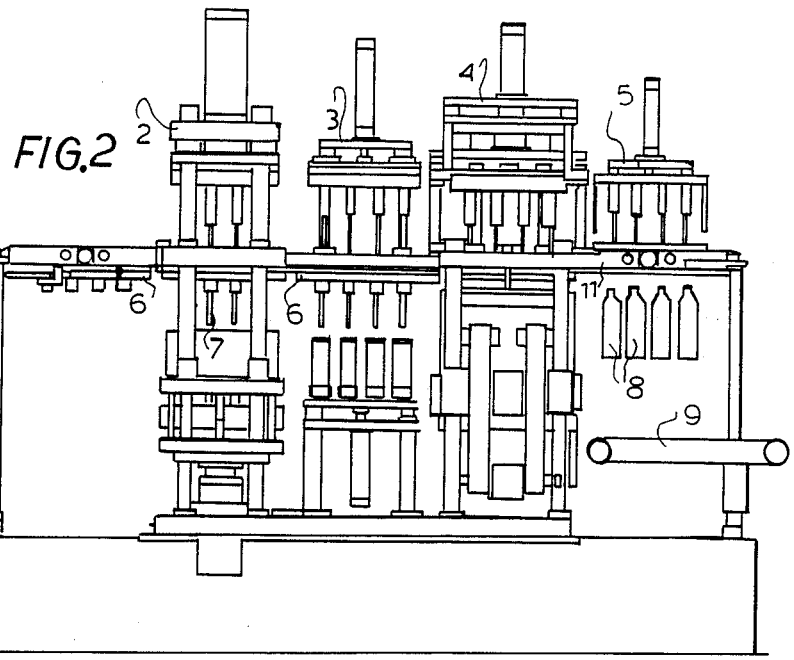
FIG. 2 is front view of the machine of FIG. 1.
Figure 3:
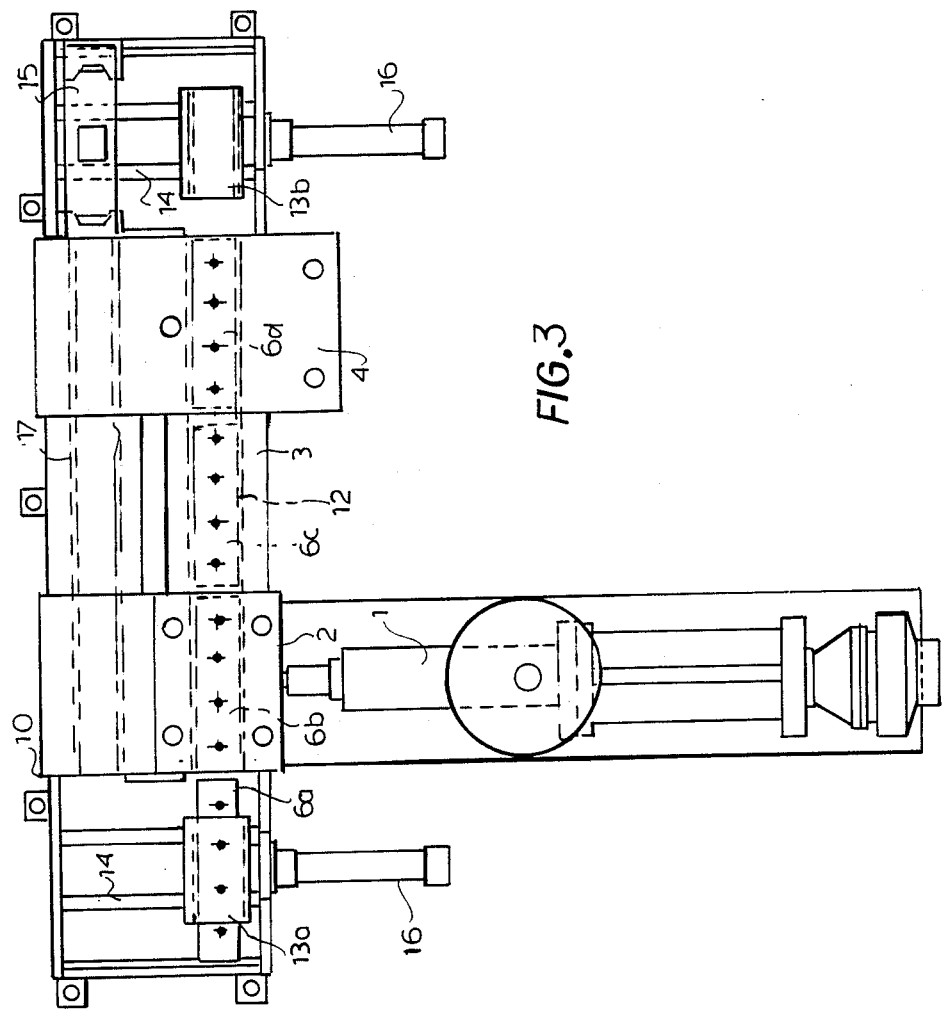
FIG. 3 is plan view of the apparatus.

As shown in FIGS. 1, 2 and in plan in FIG. 3, the apparatus for the production of blown hollow containers of plastic material with biaxial molecular orientation according to this invention comprises, essentially, an extruder 1, capable of being connected to an injection molding unit 2, one or more thermal conditioning and axial elongation units 3, a blowmolding unit 4 and a discharge station 5. The units are linked to one another by a conveyor device adapted for transferring the carriages 6, carrying the containers during the forming phase, to the successive stations.

The carriages 6 are equipped with one or more seats for securing the containers. In the embodiment illustrated, the carriages 6 each possess four seatings. The injection moulding unit produces, by molding, the hollow bodies 7, termed "preforms", which are adapted to be subjected to the succeeding molding operations.

The preforms remain, after molding, suspended from the support jaws of the carriages 6, which jaws form a part of the mold, forming the neck of the container, which receives a definitive shape in the injection molding stage.

The preforms 7 are then transferred by the conveyor device to the thermal conditioning and axial elongation unit 3, where they are raised to the temperature necessary for carrying out on them a first elongation with molecular orientation in the axial direction; this temperature usually lies, for polyethylene terephthalate, between 90° and 110° C.

The blowmolding unit 4 then carries out the shaping of the blown containers 8, which remain suspended from the jaws of the carriages; the blowing for the forming of the containers 8 produces a tension in the walls of the container itself in a direction perpendicular to the tension produced by the elongation, that is to say in a circumferential direction on the lateral surface of the container, thus producing containers with walls drawn in two mutually perpendicular directions, thereby achieving an optimum molecular orientation.

After molding, the containers are transferred to the discharge station 5, by which they are placed on a conveyor belt 9 or the like and are removed from the apparatus.

As can be seen from FIG. 3, the injection molding unit 2, the thermal conditioning and axial elongation unit 3 and the blowmolding unit 4 are aligned and contiguous, spaced apart by steps equal to the length of the carriages, in such a manner that the successive carriages carrying the containers during the molding phase are disposed each beneath one of the units, remaining adjacent to and in contact with one another.

The conveyor apparatus for the carriages, as will be seen from FIGS. 3 and 4, is constituted basically of a support frame 10, equipped with an upper plate 11 (FIG. 2), to which there are secured the units 2, 3, 4, 5. Below this plate, and in correspondence with the injection molding, thermal conditioning and blowmolding units, there is present a pair of support guides 12 (FIGS. 3 and 4) for the carriages, fixed to the plate 11. These guides permit the carriages to slide from one of the aforementioned units to the other. Access for the operating members of the various units to the containers being molded and supported on the carriages below the plate 11 is assured by corresponding openings in the plate.

At the ends of the plate 11, a pair of slides 13a, 13b are provided, the one preceding the injection molding unit and the other following the blowmolding unit, these slides being slidable transversely to the direction of the guides 12 on associated support arms 14. The slides 13 are also equipped with guides 15, for receiving and supporting a carriage 6 beneath each slide.

Figure 5:
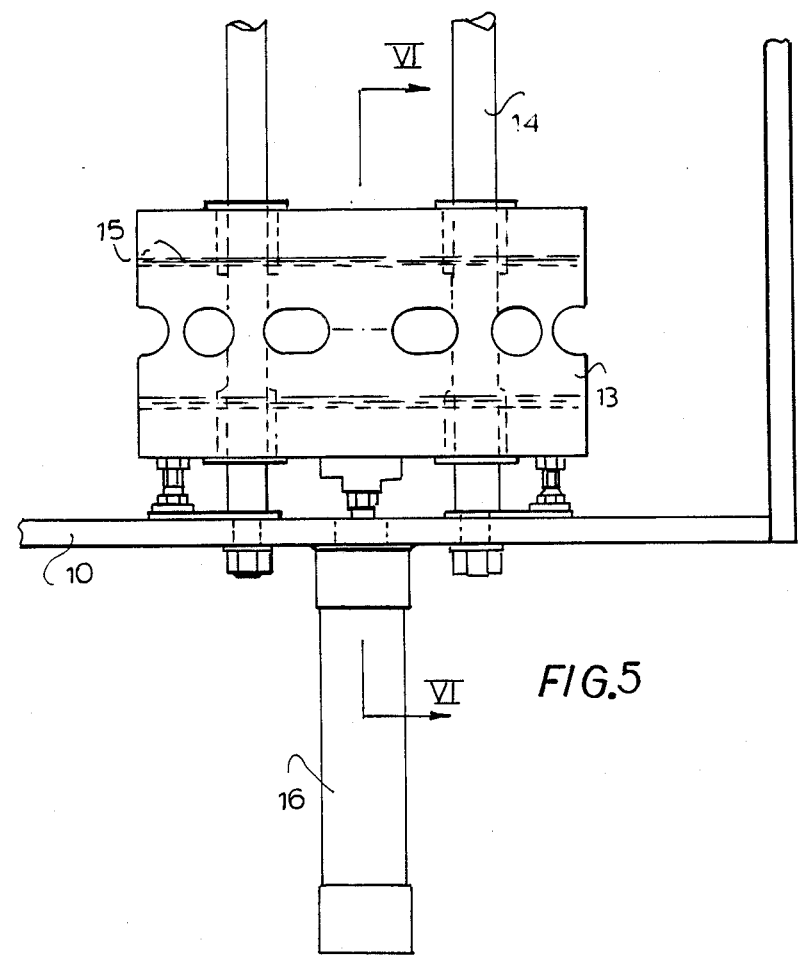
FIG. 5 is detail of the lateral traverse unit, in section along the plane V—V of FIG. 4.

As is shown more clearly in FIG. 5, each slide 13 is equipped with an associated actuator 16, for translatory movement or traversing of the slide from a position where the carriage 6 supported by it is in alignment with the carriages supported by the guides 12, to a position of alignment with the guides 17, supported beneath the plate 11 parallel to the guides 12 and behind them, as viewed in the direction of FIG. 2. At the rear end of the stroke of the slide 13b, that is to say in correspondence with its position of alignment with the guides 17, the discharge unit 5 for the finished containers is situated.

As FIG. 4 shows, in the front zone of the frame 10 an actuator 18, having a double rod 19 is located. At the ends of the rods 19 there are pusher arms 20, acting on the end face of the carriages 6 aligned beneath the slides 13 and beneath the guides 12.

Figure 7:
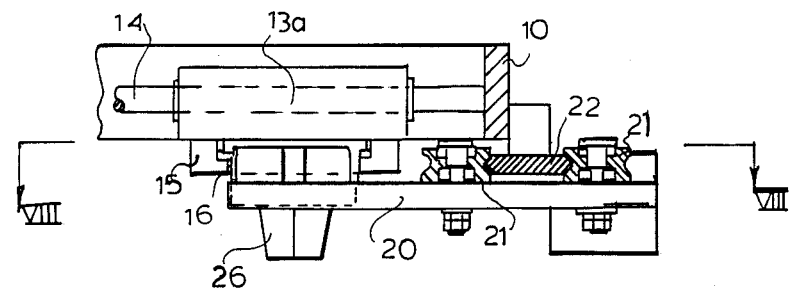
FIG. 7 is detail of the longitudinal transfer unit, in section along line VII—VII of FIG. 4.
Figure 8:
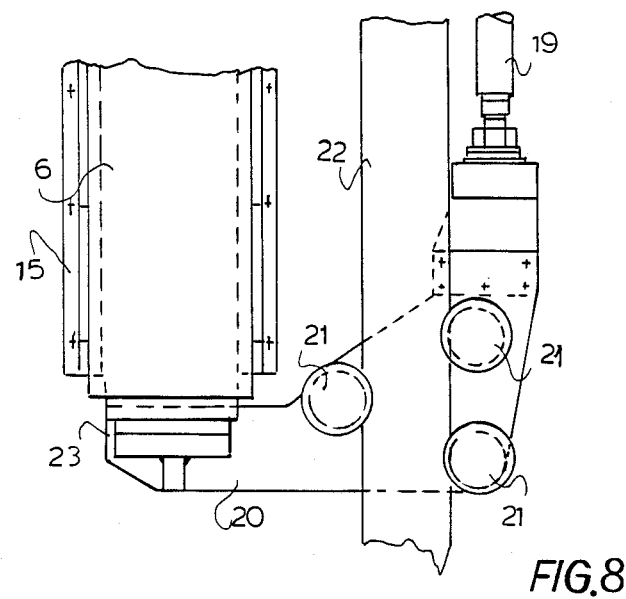
FIG. 8 is section taken along the line VIII—VIII of FIG. 7.

FIGS. 7 and 8 show, the pusher arms 20 are equipped with guide rollers 21, engaging rails 22 fixed to the frame 10.

The arm 20 bears, with its own end 23, against the carriage 6, in the space between the guides 15, and causes the carriage to slide on the guides.

The stroke of the actuator 18 is equal to the length of a carriage and its operation causes the carriages aligned between the pusher arms 20 to pass from a position beneath one of the molding units 2, 3, 4 or beneath the slide 13a to the next. When a carriage 6 has been brought beneath the slide 13b, the slide is traversed by the associated actuator 16 into the rear zone, beneath the discharge unit 5.

In the rear zone of the frame 10 there is present a further linear actuator 24, for example of the screw type, to the movable part of which there is attached a fork 25, for engaging with the carriage 6 carried by the slide 13b beneath the unit 5. The complete stroke of the fork 25 under the action of the actuator 24 causes traversing of the carriage 6 engaged by it from the support position beneath the slide 13b to the support position beneath the slide 13a.

The operating cycle of the apparatus therefore provides that three carriages 6 shall be disposed beneath the units 2, 3 and 4, and a further carriage shall be supported by the slide 13a; the carriages 6 situated beneath the units 3, 4 support the containers in the associated molding phases, while the carriages 6 situated beneath the slide 13a and beneath the injection molding unit 2 are initially empty.

After the units 2, 3 and 4 have simultaneously carried out the associated operations, the actuator 18 executes its stroke, transferring the empty carriage 6a, carried by the slide 13a, into position beneath the injection molding unit 2. This carriage 6a, in turn, pushes the carriage 6b, carrying the preforms that have just been molded, to the thermal conditioning and axial elongation unit 3. The carriage 6b in turn pushes the carriage 6c carrying the preforms that have been subjected to thermal conditioning and elongation into position beneath the blow-molding unit 3. Moving away from this unit, the carriage 6d carrying the finished containers 8, and is pushed beneath the slide 13b, which at this instant is empty in the advanced position.

The actuator 16 then traverses the slide 13b into the rear position, beneath the discharge unit 5, where the carriage 6d is opened and the containers 8 are discharged and removed.

Beneath the discharge unit 5, the carriage 6d is situated with its jaws 26, projecting downwards and adapted for gripping the neck of the container, in engagement with the fork 25. The actuator 24, in the next phase of the cycle, then transfers the carriage along the guides 17 to bring it into position beneath the slide 13a, which in the meantime has been brought into the rear position by means of the associated actuator 16.

The slide 13a then brings the empty carriage 6d, held by the fork 25, into the advanced position preceding the injection molding unit 2, while the fork 25 is brought back into its initial position to receive a new carriage traversed by the slide 13b.

At each operation of the actuator 18, therefore, a carriage is moved from one station to the next, bringing the finished containers into the discharge position each time and supplying the injection molding unit with an empty carriage, ready for receiving the containers in the course of molding.

The construction of the apparatus according to this invention enables the production cycle for the containers to be carried out in accordance with the thermal and mechanical requirements directed towards achieving a molecular structure which shall offer the best characteristics of the material; disposing the necessary operating units in a configuration which gives to them the least possible overall size, without excessive transfer devices for automatic transfer of the workpieces during moulding from one station to the next demanding, distances.

If further stations or operating units should be required on the production line, whether in an intermediate phase or after completion of moulding of the containers, said units can be inserted into the apparatus, increasing the stroke of the actuator 24 and the length of the guides 12 and 17, and adding the necessary number of carriages, without requiring further modifications to the construction of the overall complex.

The construction and operating characteristics of the individual units constituting the apparatus may be of known type, for example in accordance with what has been described in the already cited Italian Patent Application 23053 A/85, and therefore have not been described in detail.

Numerous variants can be introduced, without thereby departing from the scope of the invention in its general characteristics.

I claim:

1. A compact apparatus for molding hollow containers of a molecularly orientable plastic material, comprising:

a support frame having a perimeter;

a molding line operatively connected with said support frame, said line including a plurality of contiguous molding units aligned in a row having respective zones of action for forming the containers and a discharging unit spaced from said molding units;

a conveyor device linking said units and including:

two mutually parallel elongated linear sections spaced apart and two spaced apart and mutually parallel transverse sections bridging said linear sections, each of said sections being provided with respective rectilinear guides forming a closed path along said perimeter of said frame, one of said elongated sections linking said aligned units of said molding line, a plurality of carriages sliding along said guides and having respective support jaws for the containers along said one of elongated sections, said carriages being of uniform length and being in end-to-end relationship along said one of elongated sections, a first actuating means provided with a pusher arm for acting upon a first of said carriages along the guide of said one of the elongated sections, said first actuating means producing a stroke equal to said uniformed length of each of the carriages, so that said units with the respective zones of action spaced at the distance equal to said uniformed length of said carriages are continuously in correspondence with at least some of said carriages along said one of the elongated sections, second actuating means for advancing the carriages along the respective guide of the other elongated section between said transversal sections by a single stroke produced by said second actuating means, a respective slide provided with a respective support guide for carrying one of said carriages along each of said transverse sections of said path between said parallel elongated sections of said path, each of the slides being formed with a respective actuator for transferring said carriages between positions where each of the support guides of the respective slide is in alignment with the respective guiding means of said elongated sections of said path, said units of said molding line extending along said line with a length equal to said uniform length of said carriages, said discharging unit being above said elongated section of said path parallel to said one elongated section linking said units of the molding line.

* * * * *